Figure 1:
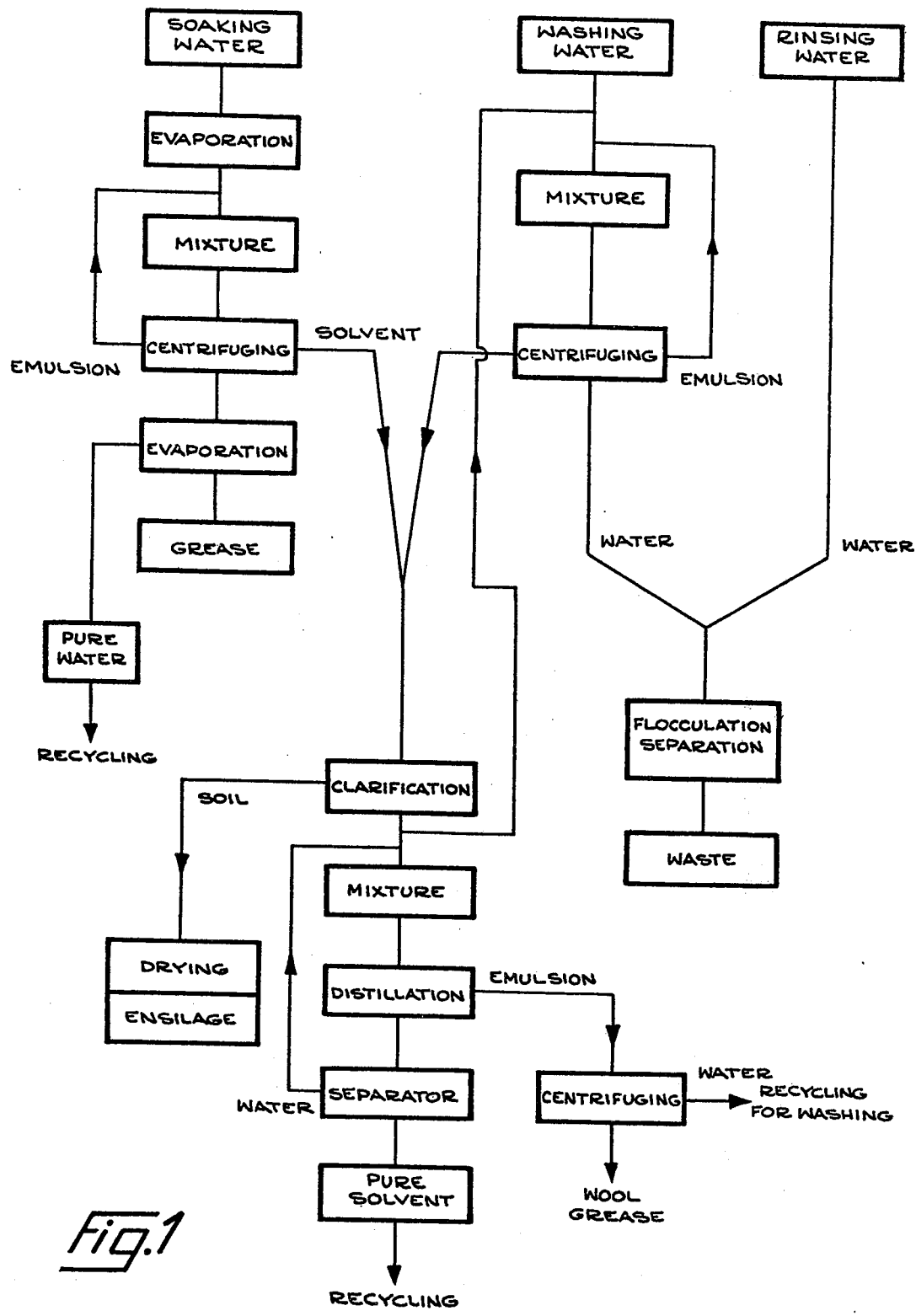

United States Patent [19]

Leman

[11] 4,124,502
[45] Nov. 7, 1978

[54] PROCESS FOR THE PURIFICATION OF GREASY AND SOILED WATER USING A HEAVY SOLVENT, AND APPARATUS FOR ITS IMPLEMENTATION

[75] Inventor: Bernard J. O. Leman, Leers, France

[73] Assignee: Peignage Amédée, Roubaix, France

[21] Appl. No.: 791,933

[22] Filed: Apr. 28, 1977

[30] Foreign Application Priority Data

May 5, 1976 [FR] France ................................ 76 13372

[51] Int. Cl.² .......................... B01D 3/36; B01D 11/00; C02C 5/00
[52] U.S. Cl. .......................................... 210/21; 210/43; 210/45; 210/59; 210/296; 210/511; 260/412.5; 422/256
[58] Field of Search .................... 210/21, 42 R, 43, 45, 210/259, 296, 511, 59; 23/270.5 R, 270.5 T, 267 R, 272.6 S; 260/412.5

[56] References Cited

U.S. PATENT DOCUMENTS

| | | | |
|---|---|---|---|
| 2,271,621 | 2/1942 | Brown | 210/21 |
| 2,762,681 | 9/1956 | Crowley | 210/42 R |
| 3,017,342 | 1/1962 | Bulat | 210/21 |
| 3,210,148 | 10/1965 | Delforge | 210/21 |
| 3,368,876 | 2/1968 | Bailey | 210/21 |
| 3,436,342 | 4/1969 | Fujiwara | 210/21 |
| 3,715,306 | 2/1973 | Mar | 210/21 |
| 3,830,789 | 8/1974 | Garrett | 23/267 R |
| 4,007,117 | 2/1977 | Smith et al. | 210/53 |

FOREIGN PATENT DOCUMENTS

| | | | |
|---|---|---|---|
| 516,280 | 6/1953 | Belgium | 210/43 |
| 1,476,917 | 3/1967 | France | 210/43 |
| 2,196,971 | 12/1974 | France | 210/43 |
| 617,250 | 2/1947 | United Kingdom | 210/21 |
| 1,222,561 | 5/1968 | United Kingdom | 210/42 R |
| 1,298,878 | 12/1971 | United Kingdom | 210/43 |
| 1,436,459 | 5/1976 | United Kingdom | 210/43 |

Primary Examiner—Charles N. Hart
Assistant Examiner—Ernest G. Therkorn
Attorney, Agent, or Firm—Merriam, Marshall & Bicknell

[57] ABSTRACT

A process for the purification of waste water containing grease and soil, especially the effluent from wool-soaking and wool-washing, which comprises mixing the waste water with a heavy solvent; separating the emulsion formed to obtain degreased water, a small quantity of water-solvent emulsion, and solvent charged with greasy matter and soil; clarifying this solvent to separate the soil; subjecting the clarified solvent to an azeotropic distillation in the presence of water, to form an emulsion from which the greasy matter can be recovered, and a head product from which the solvent can be regenerated, and apparatus therefor.

13 Claims, 2 Drawing Figures

PROCESS FOR THE PURIFICATION OF GREASY AND SOILED WATER USING A HEAVY SOLVENT, AND APPARATUS FOR ITS IMPLEMENTATION

This invention relates to the continuous purification of water containing grease and soil, especially water that has been used for washing untreated wool.

The washing of untreated wool is an operation which requires large quantities of water and which results in serious contamination of the water. It is therefore very desirable to provide an efficient purification process which enables at least part of the water to be recycled and valuable materials, such as greasy matter, soil, fertilizing substances and detergent, to be recovered.

Various processes for purification of water that has been used for washing wool have already been proposed, but the product of these processes is greasy and highly hydrated sludge which cost a great deal to treat. In addition, these processes have the following disadvantages: the sludge and the greasy matter become mixed by treatment which causes coagulation; the washing baths are acidified, which means that only average quality wool grease is recovered; and the greasy water is concentrated so that the residue can be burned, and, in so doing, part of the greasy matter is lost.

French Patent Specification No. 2 196 971 proposes subjecting the suint-containing water obtained from washing wool to two successive mechanical purifications: in the first purification greases and water are separated from the crude soil and then from the crude sludge; the greases are recovered and the water is re-used for washing the wool; the crude soil and crude sludge, constituting the reject matter from this first purification, are combined and this reject matter is subjected to a second mechanical purification. The disadvantage of this process is that it necessitates treatment of aqueous sludge.

French Pat. No. 1 476 917 proposes recovering the wool grease present in the waste water from washing wool with soap or synthetic detergents, by means of a solvent. According to this process, a certain quantity of wool grease is separated by a preliminary centrifuging operation and the washing water is mixed with 1 to 10% by volume of an aliphatic alcohol. The heavy phase containing no wool grease is then separated from the light phase which essentially consists of wool grease and alcohol, and the wool grease is isolated from this light phase. This process has the disadvantage of producing a water saturated in alcohol and containing soil. In addition, it is not possible to separate sludge at the same time as removing the grease.

Belgian Pat. No. 516,280 and British Pat. No. 1,298,878 are also concerned with the recovery of wool grease from washing water.

I have now developed a purification process, according to which the waste water is mixed with a heavy solvent (more dense than the water); the emulsion formed is separated so as to obtain de-greased water, a small quantity of an emulsion of water and solvent, which is recycled into the mixing device, and the solvent, charged with greasy matter and soil; this solvent is subjected, first to a clarification which enables soil, from which the residual solvent can easily be extracted, to be separated, and then to azeotropic distillation in the presence of water which separates an emulsion (tail product), from which it is possible to recover the greasy matter, and a head product, from which the solvent can be regenerated.

This process enables greasy matter, soil and certain dissolved salts to be separated, and may be used for all or only a part of the waste water. Completely de-greased and de-soiled water can be recovered as well as grease, the majority of the detergent that may be present in the waste water, and also all the soil; this soil can be recovered in anhydrous form and not in the form of sludge, which would be difficult and costly to dry.

Accordingly, the present invention provides a process for the purification of waste water containing grease and soil, which comprises mixing the waste water with a heavy solvent; separating the emulsion formed to obtain de-greased water, a small quantity of water-solvent emulsion, and solvent charged with greasy matter and soil; subjecting this solvent to a clarification to separate the soil; subjecting the clarified solvent to an azeotropic distillation in the presence of water, to form an emulsion from which the greasy matter can be recovered, and a head product from which the solvent can be regenerated.

One method of separating the initial emulsion is by centrifuging.

Preferably, the soil separated from the solvent in the clarification step is dried.

Preferably, also, grease is recovered from the emulsion obtained on azeotropic distillation, for example by centrifuging.

Furthermore, the solvent is preferably regenerated from the head product obtained on azeotropic distillation, for example by condensation and separation, and water and solvent are optionally recycled. Recycling of part of the soil-free solvent before distillation may also be carried out.

The small quantity of water-solvent emulsion separated from the initial emulsion may also be recycled.

The process of the present invention applies especially to effluent from soaking, washing and rinsing wool.

Preferably, the de-greased water obtained according to the process of the present invention from the soaking water is evaporated to obtain suint; the condensate may be recycled.

Before mixing with the solvent, the soaking water is preferably evaporated to adjust the concentration of greasy matter.

If required, the de-greased water obtained according to the present invention from the wool-washing water and preferably also the wool-rinsing water, is purified by a method known per se.

Therefore, the present invention especially provides a purification process for water used for soaking, washing and rinsing wool, according to which the soaking water is subjected to preliminary evaporation which, if necessary, allows for the concentration of the greasy matter it contains to be adjusted to an appropriate degree, is de-greased in the heavy solvent and then subjected to a concentration by evaporation, the condensate collected being recycled, and the soluble salts which constitute the suint being recovered; and the washing water is de-greased in the heavy solvent, the solvent charged with greasy matter and soil from this de-greasing and from the de-greasing of the soaking water is clarified, which enables the soil from which the residual solvent is extracted, to be separated, the solvent then being distilled by azeotropic means in the presence of water, which enables the solvent to be recovered, by separation from the head product, and subsequently recycled, and the greasy matter to be recovered in the form of an emulsion which is then centrifuged; and, if necessary, the de-greased washing water is subjected, preferably in admixture with the wool-rinsing water, to a conventional physico-chemical purification.

According to a special method of implementation of this process, the suint recovered is mixed with the dried soil separated to obtain a fertilising powder, which can be marketed as manure.

The process of the present invention may be implemented using an apparatus comprising a mixing apparatus for the solvent and the water to be treated, a centrifuging separator preferably with three outlets, a clarifier and a distillation tower.

The present invention also provides apparatus for carrying out the process of the present invention, which comprises (a) the following devices for treating the soaking water: a multi-action evaporator, followed by an emulsifier, a disc centrifuge, another multi-action evaporator and a storage means for the suint;

(b) the following devices for treating the washing water: an emulsifier, followed by a disc centrifuge;

(c) the following devices for treating the solvents from treated washing and soaking water: a clarifier, being followed on the one hand by a distillation tower followed, on the one hand, by a Florentine separator and a device for storing and recycling the solvent, and, on the other hand, by a centrifuging separator and a storage means for the greasy matter; and
on the other hand by a device for drying and storing the soil; and (d) if required, a device for the physico-chemical purification of a mixture of rinsing water and de-greased washing water, for example a flocculator-decanter.

Figure 2:
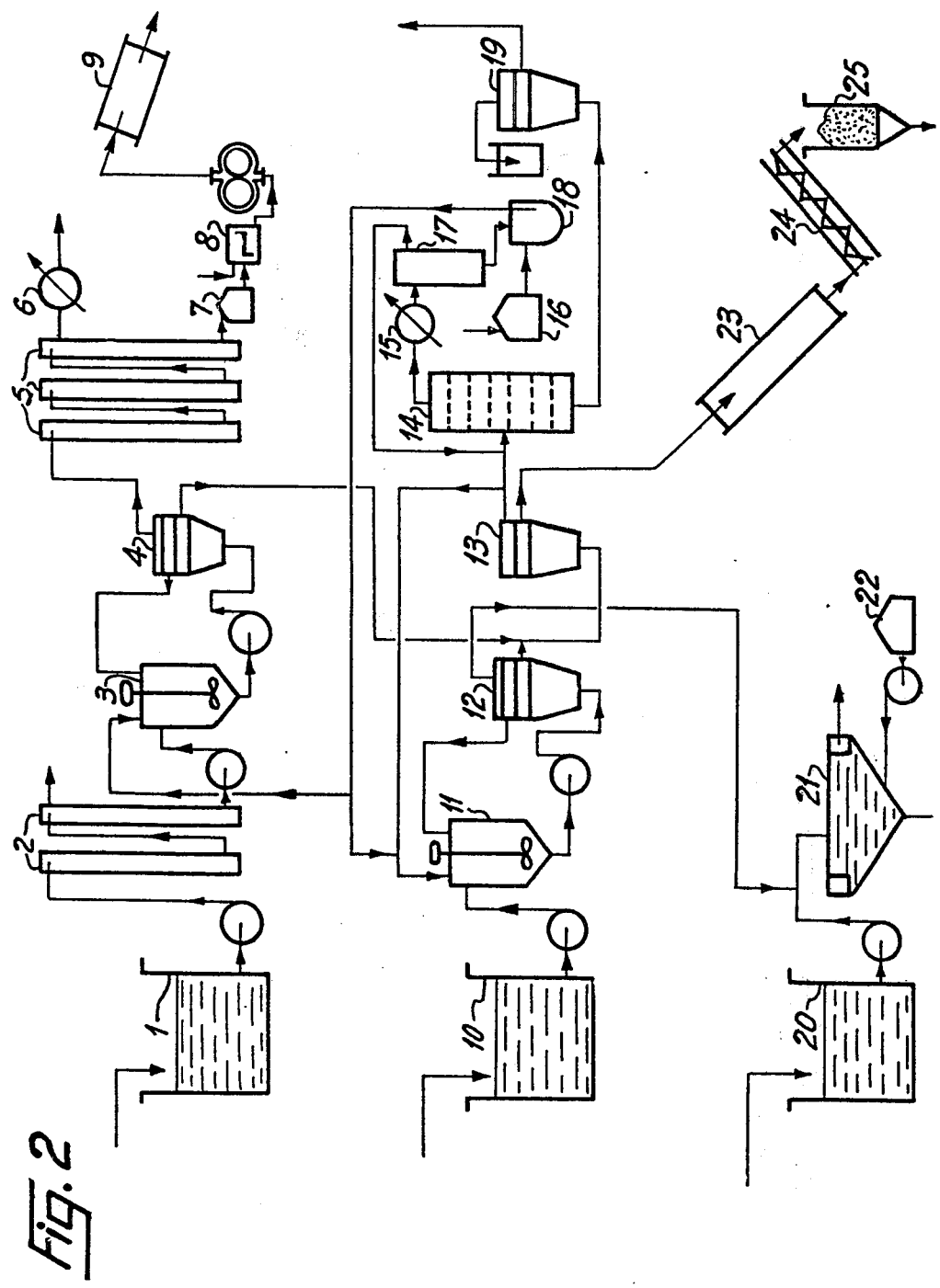

The invention will now be described in further detail, by way of example only, with reference to the accompanying drawings in which:

FIG. 1 is a flow sheet of a process according to the invention for the purification of effluent from wool-soaking, -washing and -rinsing; and FIG. 2 is a flow sheet of an apparatus for the implementation of the process illustrated in FIG. 1.

Referring to FIG. 1, the soaking water is first subjected to a preliminary evaporation which enables the concentration of greasy matter it contains to be adjusted to a degree appropriate to the subsequent treatment, for example from 5 to 15 g/liter. Good results have been obtained with a concentration of greasy matter of approximately 9 to 10 g/liter. The condensate from this preliminary evaporation can be recycled.

Of course, if the concentration of greasy matter that the soaking water contains is satisfactory, the preliminary evaporation may be omitted.

The water of appropriate concentration is then subjected to de-greasing using a solvent more dense than water: for this, it is first mixed with the solvent, for example in an emulsifier, then subjected to centrifuging. The ratio of the mixture of solvent : water is advantageously in the range of from 1 : 3 to 1 : 8 and is preferably substantially 1 : 5. This mixing may take place at the ambient temperature or at a higher temperature as a function of the boiling point of the solvent and as a function of the characteristics of the greasy matter to be separated. Centrifuging may be carried out in a disc separator.

For de-greasing, it is advantageous to use halogenated solvents, especially carbon tetrachloride, perchloroethylene or trichloroethylene, more especially perchloroethylene. This process may, however, be carried out with non-halogenated solvents or with mixtures of solvents, in so far as these solvents or mixtures of solvents are more dense than water.

After centrifuging, three products are obtained:

(i) de-greased water, containing no solvent (light phase);

(ii) an emulsion of water and solvent (middle phase), normally in the form of a gel, which is recycled into the device for mixing water and solvent; this emulsion forms in a small quantity, its volume usually being less than 5% of the total volume;

(iii) the solvent, charged with greasy matter and soil (heavy phase) that is subjected to clarification as indicated below.

The de-greased water is concentrated by evaporation to obtain a concentrated solution of suint. The evaporated water may be condensed and recycled.

The washing water is subjected to de-greasing. For effective de-greasing, it is advantageous for the content of greasy matter in this water to be in the range of from 5 to 15 g/liter. This content may, if required, be adjusted to the appropriate amount by preliminary centrifuging.

The washing water of appropriate concentration is subjected to de-greasing, in a manner analogous to that described above for the soaking water.

The solvent obtained (heavy phase) is mixed with the solvent from the de-greasing of the soaking water, and the whole is subjected to clarification. After this, the solvent is substantially completely free of soil.

The recovered soil is cleared of residual solvent and, if necessary, broken down. As has been indicated, it may be mixed with the concentrated solution of suint to form, after drying, a marketable fertilizing product, or may be used as such, for example in the manufacture of goods made of terra cotta.

One part of the solvent may be recycled into the device for mixing the solvent and the washing water. The other part is subjected to an azeotropic distillation in the presence of water. In the case of perchloroethylene, good results were obtained by recycling ⅔ of the solvent and subjecting the remaining third to distillation in the presence of 30% of water under a vacuum of approximately 30 to 40 cm Hg.

The head product is condensed and separated, for example in a Florentine separator, into water and solvent, these two products being recycled.

The tail product (emulsion of wool grease) is treated in a centrifuging separator to separate the wool grease and the water, which contains a reasonable quantity of the detergent that was originally present in the washing water. The washing water may be recycled.

If the rinsing water is not suitable for re-use or discarding, it is mixed with the de-greased washing water and purified by conventional physico-chemical means. The mixture may, for example, be treated in a flocculator-decanter in the presence of a flocculant, preferably ferric chloride, or subjected to flotation treatment.

Referring to FIG. 2, the soaking water is collected in a tank 1, then evaporated in an evaporator 2. The water condensed may be recycled to the wool-washing apparatus. The concentrated soaking water from the evaporator 2 is then mixed with a solvent in an emulsifier 3, then centrifuged in the separator 4 to separate soil- and grease-containing solvent, a small quantity of water-solvent emulsion which is returned to the emulsifier, and de-greased water which is evaporated in an evaporator 5. The evaporated water is condensed in a condensor 6 and recycled into the wool-washing apparatus, while the concentrated suint is stored in a vat 7. The suint is taken up again, then mixed with dry soil in a mixer 8. The mixture is then dried in a drum drier 9.

The solvent separated from the separator 4 is mixed with that separated during the purification of the washing water.

The washing water is collected in a tank 10, then mixed with solvent in an emulsifier 11. The mixture is then centrifuged in a separator 12 to separate de-greased water, a small quantity of solvent-water emulsion which is recycled, and solvent which is clarified in a clarifier 13. One portion is recycled into the emulsifier 11, and one portion is retained, mixed with fresh water and distilled in a column 14. The azeotropic mixture is condensed in a condensor 15. The water is separated from the solvent in a Florentine separator 17, then recycled, to be mixed with the solvent to be distilled in the column 14. The solvent collected is re-circulated by a monte-jus 18 into the emulsifiers 3 and 11, fresh solvent being added from a storage tank 16 to compensate the solvent losses. The aqueous emulsion of wool grease collected at the base of the distillation column 14 is separated by a centrifuge 19. The grease is collected, and the water containing the detergent is recycled into the washing tank.

The soil extracted from the solvent by the clarifier 13 is dried in a drier 23, taken up by a worm conveyor 24 and stored in a silo 25.

The rinsing water is collected in a tank 20, mixed with de-greased washing water from the separator 12, then flocculated and decanted in a flocculator-decanter 21, the flocculant being supplied by a unit 22.

The water treated in this manner can be thrown away in the receiving area.

The process of the invention has a number of advantages. With the process, it is possible:
to recover all the soil in powder form;
to recover almost all the greasy matter;
to provide in marketable form a powder containing the natural fertilizing substances constituting suint;
to recover most of the detergent used for washing the wool;
after purification, to recycle part of the waste water; and
to throw away the part that has not been recycled, without the contamination of this water having an adverse effect on the receiving area.

According to the de-contamination needs and volumes of water to be treated, it may be necessary to implement only one part of the purification process described above. Thus, for example, it is possible to carry out the treatment of the washing water only.

I claim:

1. A process for purifying waste water containing grease and soil which comprises:
mixing waste water containing greasy matter and soil with a heavy solvent in a mixing device in a solvent to water ratio of 1 part solvent to 3 to 8 parts water to form an emulsion;
centrifuging the emulsion to obtain degreased water, a small quantity of water-solvent emulsion and solvent containing greasy matter and soil;
separating the soil from the solvent containing greasy matter and drying the soil;
azeotropically distilling the solvent containing greasy matter in the presence of water to recover pure solvent as the head product and a tail product containing greasy matter; and
centrifuging the tail product to isolate the greasy matter.

2. A process according to claim 1 in which the waste water containing greasy matter is from wool soaking and the degreased water is evaporated to recover suint.

3. A process according to claim 2 in which the suint is combined with the dried soil.

4. A process as claimed in claim 1, wherein, before treatment with the solvent, the waste water is evaporated to adjust its grease content to a value in the range of from 5 to 15 g/liter.

5. A process as claimed in claim 4, wherein the grease content is adjusted to from 9 to 10 g/liter.

6. A process as claimed in claim 1, wherein the solvent-water ratio is substantially 1 : 5.

7. A process as claimed in claim 1, wherein part of the clarified solvent before azeotropic distillation is recycled by mixing with the waste water to be treated.

8. A process as claimed in claim 7, wherein the solvent is perchloroethylene and two thirds of it is recycled, the remaining third being distilled in the presence of 30% of water under a vacuum of from 30 to 40 cm Hg.

9. A process for purifying waste water containing grease and soil which comprises:
(A) mixing wool-soaking water containing greasy material and soil with a heavy solvent in a mixing device in a solvent to water ratio of 1 part solvent to 3 to 8 parts water to form an emulsion;
centrifuging the emulsion to obtain degreased water, a small quantity of water-solvent emulsion, and solvent containing greasy matter and soil;
evaporating the degreased water to recover suint;
separating the soil from the solvent containing greasy matter to give a first solvent body containing greasy matter and drying the soil;
(B) mixing wool-washing water containing greasy matter with a heavy solvent in a mixing device in a solvent to water ratio of 1 part solvent to 3 to 8 parts water to form an emulsion;
centrifuging the emulsion to obtain degreased water, a small quantity of water-solvent emulsion, and solvent containing greasy matter and soil;
separating the soil and the solvent containing greasy matter to give a second solvent body containing greasy matter;
(C) combining the first and second solvent bodies containing greasy matter from (A) and (B) and clarifying the resulting mixture;
subjecting the resulting clarified solvent mixture containing grease to an azeotropic distillation in the presence of water to recover pure solvent as the head product and a tail product containing greasy matter; and
centrifuging the tail product to obtain wool grease.

10. A process as claimed in claim 9, wherein the degreased water obtained from the treatment of wool-washing water is mixed with wool-rinsing water and purified by physico-chemical means.

11. A process as claimed in claim 10, wherein the physico-chemical purification is a flocculation-decantation process.

12. Apparatus for purifying waste water containing grease and soil which comprises (i) a multi-action evaporator, an emulsifier, a disc centrifuge, another multi-action evaporator and a storage means for the suint, connected in that sequence;

(ii) an emulsifier, a disc centrifuge, a clarifier, a distillation tower, a Florentine separator and a device for storing and recycling the solvent, connected in that sequence, the clarifier also being connected to the disc centrifuge mentioned under (i);

(iii) a centrifuging separator and a storage means for the greasy matter, connected in that sequence to the distillation tower mentioned under (ii); and (iv) a device, connected to the clarifier, for drying and storing the soil separated from the anhydrous solvent in the clarifier.

13. Apparatus as claimed in claim 12, which includes a device for mixing the suint with soil which has been separated from the clarifier and dried.

* * * * *